US009030968B2

(12) United States Patent
Furlong et al.

(10) Patent No.: US 9,030,968 B2
(45) Date of Patent: May 12, 2015

(54) SYSTEM AND METHOD FOR PROCESSING A CONFERENCE SESSION THROUGH A COMMUNICATION CHANNEL

(75) Inventors: Jeff Furlong, Grand Bay-Westfield (CA); Robert J. Beaton, Apohaqui (CA)

(73) Assignee: Alcatel Lucent, Boulogne-Billancourt (FR)

( * ) Notice: Subject to any disclaimer, the term of this patent is extended or adjusted under 35 U.S.C. 154(b) by 560 days.

(21) Appl. No.: 11/453,875

(22) Filed: Jun. 16, 2006

(65) Prior Publication Data
US 2007/0291736 A1 Dec. 20, 2007

(51) Int. Cl.
*H04N 7/00* (2011.01)
*H04L 12/28* (2006.01)

(52) U.S. Cl.
CPC ........ *H04L 12/2803* (2013.01); *H04L 12/2838* (2013.01); *H04L 2012/2849* (2013.01)

(58) Field of Classification Search
CPC ...................................................... H04M 3/567
USPC ............. 434/236; 725/98; 709/203; 370/260, 370/261, 262, 352, 353
See application file for complete search history.

(56) References Cited

U.S. PATENT DOCUMENTS

| | | | | |
|---|---|---|---|---|
| 5,958,016 | A * | 9/1999 | Chang et al. | 709/229 |
| 6,493,020 | B1 | 12/2002 | Stevenson et al. | |
| 6,615,166 | B1 * | 9/2003 | Guheen et al. | 703/27 |
| 6,816,724 | B1 * | 11/2004 | Asikainen | 455/414.1 |
| 7,103,010 | B2 * | 9/2006 | Melideo | 370/260 |
| 7,149,698 | B2 * | 12/2006 | Guheen et al. | 705/1 |
| 7,165,041 | B1 * | 1/2007 | Guheen et al. | 705/26 |
| 7,277,424 | B1 * | 10/2007 | Dowling | 370/352 |
| 7,362,349 | B2 * | 4/2008 | Nelson et al. | 348/14.08 |
| 7,433,915 | B2 * | 10/2008 | Edwards et al. | 709/203 |
| 7,474,741 | B2 * | 1/2009 | Brunson et al. | 379/88.17 |
| 2004/0107125 | A1 * | 6/2004 | Guheen et al. | 705/7 |
| 2004/0117840 | A1 * | 6/2004 | Boudreau et al. | 725/98 |
| 2004/0117858 | A1 * | 6/2004 | Boudreau et al. | 725/144 |
| 2004/0141594 | A1 * | 7/2004 | Brunson et al. | 379/88.12 |
| 2004/0194146 | A1 * | 9/2004 | Bates et al. | 725/110 |
| 2004/0204076 | A1 * | 10/2004 | Kotzin | 455/557 |
| 2005/0060759 | A1 * | 3/2005 | Rowe et al. | 725/143 |
| 2005/0074107 | A1 * | 4/2005 | Renner et al. | 379/202.01 |
| 2005/0160468 | A1 * | 7/2005 | Rodriguez et al. | 725/109 |
| 2005/0195274 | A1 | 9/2005 | AbiEzzi et al. | |
| 2005/0249196 | A1 * | 11/2005 | Ansari et al. | 370/352 |
| 2005/0277406 | A1 * | 12/2005 | Diroo et al. | 455/412.2 |
| 2006/0001737 | A1 * | 1/2006 | Dawson et al. | 348/14.08 |
| 2006/0010368 | A1 * | 1/2006 | Kashi | 715/512 |
| 2006/0041581 | A1 * | 2/2006 | Aghvami et al. | 707/102 |
| 2006/0093998 | A1 * | 5/2006 | Vertegaal | 434/236 |

(Continued)

*Primary Examiner* — Jay P Patel
(74) *Attorney, Agent, or Firm* — Kramer & Amado, P.C.

(57) ABSTRACT

The invention relates to a system and method for controlling an aspect of a communication session. The method processes the session through a subscriber terminal that also controls a separate a video signal. The method comprises: analyzing call data for the session to determine whether a calling party can initiate the session with a called party; if the calling party is allowed to initiate the session, sending information about the session to the terminal; generating a GUI session from the information for a video monitor connected to the terminal; allowing further processing of the session through the terminal through the GUI session; if a command is received to further process the session, providing a message to the network to process the command; and if a command is received to change an aspect of the video signal, providing an appropriate message to the terminal to process the command.

18 Claims, 7 Drawing Sheets

(56) References Cited

U.S. PATENT DOCUMENTS

| | | |
|---|---|---|
| 2006/0095199 A1* | 5/2006 | Lagassey .................... 701/117 |
| 2006/0101221 A1* | 5/2006 | Harada ....................... 711/170 |
| 2006/0107330 A1* | 5/2006 | Ben-Yaacov et al. .......... 726/26 |
| 2006/0114987 A1* | 6/2006 | Roman .................... 375/240.01 |
| 2006/0117302 A1* | 6/2006 | Mercer et al. ................ 717/131 |
| 2006/0242315 A1* | 10/2006 | Nichols ...................... 709/231 |
| 2006/0252404 A1* | 11/2006 | Karkas et al. .............. 455/343.2 |
| 2006/0259552 A1* | 11/2006 | Mock et al. .................. 709/204 |
| 2006/0267857 A1* | 11/2006 | Zhang et al. .................... 345/1.1 |
| 2006/0277254 A1* | 12/2006 | Kenoyer et al. ................ 709/204 |
| 2007/0060054 A1* | 3/2007 | Romesburg .................. 455/41.2 |
| 2007/0124792 A1* | 5/2007 | Bennett et al. ................ 725/133 |
| 2007/0165554 A1* | 7/2007 | Jefferson et al. .............. 370/315 |
| 2007/0250884 A1* | 10/2007 | Qiu et al. ...................... 725/106 |
| 2007/0253432 A1* | 11/2007 | Regale et al. ............. 370/395.53 |
| 2007/0274486 A1* | 11/2007 | Kister ..................... 379/142.06 |
| 2008/0271100 A1* | 10/2008 | Hill ............................. 725/110 |
| 2012/0295549 A1* | 11/2012 | Slotznick ....................... 455/68 |

* cited by examiner

Process 500

SYSTEM AND METHOD FOR PROCESSING A CONFERENCE SESSION THROUGH A COMMUNICATION CHANNEL

FIELD OF THE INVENTION

The invention is related to processing a conference session, such as a video conference session or a telephone audio conference session, through a separate signal channel that provides an additional video signal, such as a subscriber terminal connected to a monitor for the video signal.

BACKGROUND OF THE INVENTION

Use of communication networks for distribution of entertainment, collectively referred to as "multimedia entertainment content", or "content", continues to gain popularity fuelled by the decreasing cost of equipment and bandwidth to the home, and emergence of interactive personalized services. These services include TV programming, pay-per-view (PPV), video-on-demand (VoD), games, as well as Internet access.

In general, at a subscriber's site, a subscriber terminal (e.g. client, receiver, decoder, set top box, or media player) is connected to a television or video monitor. The client receives and processes such content from a remote video server and provides them to the television based on the user's selection through a local controller. The user has the option to select for viewing one of a plurality of channels, which are broadcast from a head-end or streamed from a server with pre-stored content files.

Additional conference sessions (e.g. video and/or audio sessions) may be provided through separate communication channels to a separate communication device at the site.

There is a need for a system and method to provide access to or control aspects of the conference session without using a separate device.

SUMMARY OF THE INVENTION

In a first aspect, a method for controlling an aspect of a communication session is provided. The session involves a calling party and a called party processed through a communication network. The method includes processing the session through a subscriber terminal associated with the called party that also controls a separate a video signal. The method comprises: analysing call data for the session to determine whether the calling party is allowed to initiate the session with the called party; if the calling party is allowed to initiate the session, sending information about the session, perhaps in a message, to the subscriber terminal relating to the called party; generating a GUI session from the information for a video monitor connected to the subscriber terminal to display particulars relating to the session; providing an option to further process the session through the subscriber terminal through the GUI session; if a command is received to further process the session, providing a message to the network to process the command; and if a command is received to change an aspect of the video signal, providing a message to the subscriber terminal to process the command.

In the method, the GUI session may be terminated automatically after a set period of time if no command is received at the subscriber terminal relating to the session or to the video signal.

In the method, a server may be associated with the network to generate a signal to generate the message after the server receives particulars about a called party for the call and matches the particulars against a database.

In the method, the database may have data to correlate addressing information about the subscriber terminal with the number of the called party.

In the method, the GUI session may be terminated by a message received at the subscriber terminal indicating that the session has been answered or has been terminated.

The method may further comprise: receiving at the terminal a request to initiate an outbound session; generating a GUI session about the outbound session; obtaining "buddy list" connection data for the outbound session and incorporating the data into the GUI; receiving at the terminal a command to initiate the outbound session with one of more called parties selected from the data; updating the GUI session to include details about the called parties; and initiating a command from the terminal to the network to initiate the outbound session with the called parties.

In a second aspect, a system for controlling an aspect of a communication session involving a calling party and a called party is provided. The session is processed through a communication network through a subscriber terminal associated with the called party that also controls a separate a video signal. The system comprises: a server associated with the network, the server controlling aspects of the session; receiving particulars about the session through the network and accessing a database to search for an entry therein relating to calling party; and if the database contains the entry generating a message to the subscriber terminal relating to the session; the database, which is accessible by the server and which contains data relating to telephone numbers, the called parties, the calling parties and subscriber terminals; and a subscriber terminal for managing a connection request for the session originating from the network and for managing the video signal originating from an independent source. The subscriber terminal comprises: a first module to receive the message relating to the session; a second module to generate and control a GUI session for a video monitor connected to the subscriber terminal to display particulars relating to the session; a third module to receive and process a response signal from a view at a video monitor connected to the terminal and displaying the GUI session; a fourth module to generate and send a response message to the server to process the command when a command is received to further process the call; and a fifth module to generate and initiate a command relating to the video signal when a command is received to change an aspect of the video signal.

In the system, the second module may terminate the GUI session automatically after a set period of time if no command is received at the subscriber terminal relating to the call or the video signal.

In the system, the message may also used by the subscriber terminal to adjust downwardly an audio signal associated with video signal while the GUI session is active.

For the system, the terminal may further be used to initiate an outbound session to one or more called parties. Therein, the terminal obtains call data associations for the outbound session from the database; generates an outbound session GUI for the video monitor; and receives and processes call connection requests for the called parties for the outbound session from a user at the terminal.

In other aspects, various combinations of the sets and subsets of the above noted combinations are provided.

BRIEF DESCRIPTION OF THE DRAWINGS

Aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Briefly, an embodiment enables a target participant for a call, such as a video or telephone conference session, to answer, initiate, or control aspects of the call through a set top box associated with a television. The communication terminal for the conference call is preferably also provided through the set top box. As such, both the call and the television signals can be provided through one set top box and one display monitor. Prior art systems teach having a separate terminal for a conference session and a separate terminal for video signals for the television.

In one aspect, when a call is initiated from an external source (e.g. an external video conference request or an external telephone conference request), the signal is forwarded to the set top box for further processing instead of being forwarded to a separate conference communication device. The set top box receives the signal and can process one or more aspects of the call, including call initiation, set-up and termination. In processing aspects of the call, the set top box provides a series of GUIs to the connected television to the user to allow the user to control aspects of the call. Depending on controls and signals available to set top box relating to the call, aspects of the call may be processed through the set top box.

Figure 1:
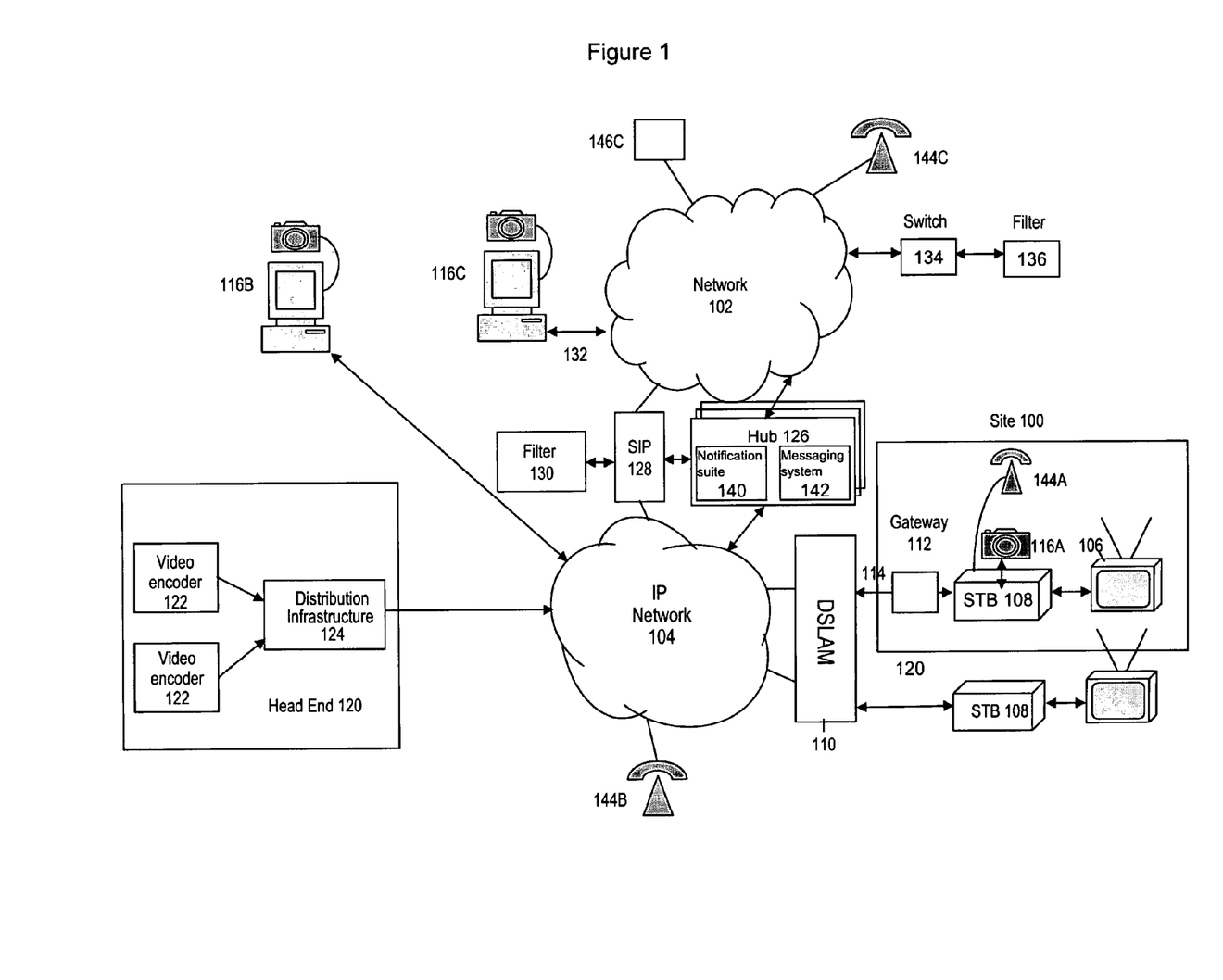
FIG. 1 is a block diagram of a video server network and a communication network each providing a connection to a site, where a client, such as a set top box associated with the video server network provides video signals to a television and also provides control over aspects of calls connecting a communication device at the site to the voice communication network according to an embodiment.

Further detail on an embodiment is provided in FIG. 1 showing a system having telecom network 102 and data network 104 are shown. Devices, servers and switches are connected to and between each network in providing aspects of an embodiment.

First, a description is provided on video processing and distribution aspects of an embodiment. At site 100, television 106 is connected to an on-site set top box (STB) 108, which receives video signals from network 104 through an external server 110, which provides the signals to a local residential gateway 112 through a local connection 114, which then forward the signals to the STB 108. As will be described below, connection 114 may also receives ancillary data relating to a call destined for communication terminal 116A. Separate telephone 144A may also be connected to STB 108. Alternatively, telephone 144A may have a separate connection to an external network (not shown).

STB 108 represents any type of subscriber terminal that is enabled with a display for viewing the content received from server 110, such as a subscriber terminal box, a CD or DVD player, a personal computer (PC), etc. STB 108 includes a decoder for converting the content of the streams of multimedia content streams into the respective audio and video information, an IPG (interactive program guide) application that enables the user to view and select the content of interest from the server, and an ordering module that transmits membership requests for reception by the listening module of server 110.

Terminal 116A may include one or more input/output devices to provide a video capture facility for a video or telephone call handled through networks 102, 104. Such devices include a still or video camera, speaker and microphone. As such, terminal 116A and STB 108 provide an input for audio and video signals and outputs for audio signals received by STB 108 for the call being processed. It will be appreciated that in other embodiments, components in unit 116B may be provided as one or more separate units. Alternatively or additionally, telephone 144A may be connected to STB 108 to provide audio input/output features for terminal 116A.

Ultimately, video signals provided to STB 108 originate from one or more video sources connected to network 104. Exemplary video sources include a head end 120 and one or more hub offices 122 that each individually connect to network 104. In other embodiments, other network configurations may be provided to feed video signals to STBs 108.

In one distribution configuration, head end 120 provides a centralized, a "national" video channel distribution centre for the STBs in network 104. The channels provided by head end 120 are multicast through network 104 to all STBs 108. Each STB 108 can selectively tap into one (or more) of the channels. Head end 120 comprises one or more video encoders 122 that process the central video signals into a transmittable format and provide them to distribution infrastructure 124 for data encapsulation, addressing and transmission to network 104. Meanwhile each hub office 126 connected to network 104 is itself associated with a set of STBs 108. Each hub office 126 provides local channels that are multicast to its set of STBs 108 in addition to channels provided by head end 120. As such, a hub office 126 may also have a corresponding video encoder and distribution infrastructure (not shown) to generate and distribute its local channels. Each hub office 126 may also provide control signals or commands to its set of locally connected STBs 108.

Video signals destined for STB 108 are encapsulated into packets addressed to server 110, which acts as a server for all video signals provided to STB 108. Server 110 receives encoded streams from head end 120 through network 102 and streams the multimedia entertainment content to one or more STBs 108 upon request. Server 110 may be conveniently provided in a digital subscriber line access multiplexer (DSLAM) or within any network device already present close to the edge. For the embodiment shown, the DSLAM sends unicast packets to individual connections 114.

Server 110 includes a synchronization module, a listening module, receiver for receiving the content streamed from head end 120 or hub office 126 and sender module for each STB 108 that plays back the content offered by the server 110 at a certain moment. While none of these modules is shown in FIG. 1, it will be appreciated that they may be implemented in an appropriate set of software, firmware or hardware modules that can generate and process such messages and commands there between.

In server 110, synchronization module tracks milestones that occur in each stream, for enabling each STB 108 to receive the channel it requests, starting with the most recent milestone in the stream after the announcement has been received by server 110. Receiver module inserts the packets in the multicast transport stream in a circular buffer of the synchronization module and tracks the real-time position of the STBs 108 in the buffer, i.e. it tracks the position in the buffer of the packet that is currently sent by the respective sender module to the associated STB 108. The position of each sender module in the buffer is tracked from the most recent milestone at the moment a respective client requested the channel. Since requests from each client come at different times, each client is at a different position in the buffer.

Listening module generates and transmits messages on a periodic basis to query which STBs 108 that have notified server 110 that they wish to receive multicast traffic. The messages generated by the clients, called membership reports or requests, provide requests to join or leave specific multicasts and indicate the subscriber client multicast address. Listening module examines the reports and either enables or disables forwarding of that particular multicast. Other mechanisms for detecting a channel change request may be equally used, such as a an unicast listening HTTP mechanism, (i.e. listening module may be a HTTP/Javascript interface, which is also available on set top boxes), or an RTSP mechanism. Advantageously, if detection of requests is implemented using Internet Group Management Protocol (IGMP) snooping, the solution according to the invention will support multicast security enhancements and will time-out clients that no longer respond to IGMP queries.

Now, a description is provided on processing at a site through a single set top box, a separate call that is being conducted independently of a video signal destined for a television attached to the box.

For the sake of convenience, and not limitation, the terms "conference call" (or simply "call") and "conference session" are used herein to refer to any communication dialog, session, service, connection, etc. between one or more persons at one or more communication devices, terminals, telephones, video terminals, cell phones, etc. For the session, the audio and video signals may be processed through one or more communication links or messaging sessions established through the network among the parties involved in the conference session.

First, a description is provided on exemplary networks that can route a call and a video signal to a set top box. Generally, two network architectures are available: packetized and switched network architectures. An exemplary packetized network is Internet protocol (IP) network 104. Communication management features for network 104 are provided in part by IP switch 128 and session filter 130 (discussed in further detail below). An exemplary switched network is network 102, which may be a plain old telephone service (POTS) network. Generally communication terminals 116 may be connected to either network and IP network 104 through another residential gateway (RG) 112 and STB 108. Telephone (communication terminal) 116C is connected to network 102 through connection 132. Telephone 144C and data server 146C are also connected to network 102; similar devices may also be connected to network 104. Network 102 may provide a digital connection system such as a time division multiplex (TDM) system. TDM switch 134 and TDM call filter 136 are connected to network 102 to provide call management features for its calls, akin to switch 128 and call filter 130. Features and architectures from both networks may be combined into a single network for the embodiment.

For network 102 and IP network 104, an IP multimedia subsystem (IMS) gateway 138 is provided to connect the two networks and to allow voice data and communications to be exchanged between the networks and then subsequently processed by the receiving network. As such, IMS gateway 138 provides appropriate addressing and other information for data, packets and signals relating to calls handled between the two networks, for example for a call involving communication terminals 116 and 116 B.

Both communication networks provide session management features that are handled by switch 128, 134. Such management features include providing call routing information when an inbound or outbound session is being made by a communication terminal in its network. When an initiating communication terminal initiates a call, the routing parameters, forwarding parameters and call resource management parameters may be provided by the switch associated with its network. As such, the switch can monitor for new calls and receive, extract and process the parameters of the call. Alternatively, other elements in the network of the called party may provide some routing parameters. Provisioning of such information is provided through monitoring systems and techniques known in the art.

In IP network 104, switch 128 may be provided by an interface switch, such as a Session Initiation Protocol (SIP) switch. Such SIP interface systems are known in the art and include, as an example, Alcatel switch 5020 (trade-mark). SIP is an ASCII protocol that can be used to assist in establishing, modifying, and executing communication sessions between one or more participants. For example, where a telephone call is being established between (remote) communication terminal 116B and communication terminal 116, filter 130 receives call particulars (including all calling and called identification parameters relating to the parties. SIP filter 130 provides call routing information for elements in networks 102 and 104. It can be an ancillary server to the main network. Different servers may provide different details of information. Where other network architectures use the same network to process signals from voice and video systems (e.g. IP voice signals and IP television signals), filter 130 may be connected to that network and provide connections and data to both systems.

When a call is being established, resources and routes are negotiated through the networks from its originating location (e.g. calling party from the originating communication device) to its destination(s) (e.g. called party at the destination communication device). During the call, a suite of call management signals and status reports is generated within the networks. Some of the signals and reports are provided to the terminals. Report and signals that are provided to the terminals may include: caller identification signals, call forwarding signals, call block signals, call display signals, voice mail initiation signals and other call management signals and features as known to those skilled in the art. Some of the signals are generated by the terminals; some are generated by the switch in the network. In any event, the signals are generally provided or intercepted by the switch as the call is being processed through the network.

In each network, filter server 130, 136 is connected to each associated switch 128, 134. Each filter can monitor the call management traffic being processed by its associated switch. A switch receives details about an initiated call and generates equivalent message(s) relating to the call (e.g. "invite", "trying" and "ringing") and provides the message(s) to its filter.

Filter 130, 136 can extract selected call data for a session and further process it to provide additional features for the session. For example, when a session is initiated and the session parameters are processed by the associated switch, the associated filter can extract this information. Thereafter the filter can generate ancillary messages that may be sent to ancillary devices associated with the called communication terminal. The ancillary devices can then provide additional call processing features for the call, thereby enhancing the user environment for the session. Alternatively or additionally, the filter can generate signals that are further processed by other elements, which then generate messages that may be sent to ancillary devices associated with the called communication terminal. Further still, additional messages and signals may be sent to any other ancillary devices associated with the calling party. For example, the filter can then process such signals and selectively identify and generate a corresponding message that can be sent to STB 108 allowing the STB 108 to provide information about the call to its connected television.

In particular, a database may be maintained at the filter to track and identify aspects of a session being established between a calling party and one or more called parties. It will be appreciated that several types of databases can be provided and maintained for the filter that provide information on the called and calling parties. The databases may also be maintained by a server system in hub office 126 or head end 120 that pushes that data down to each connected filter. While an exemplary database is described that resides and is accessed by modules at a filter, it will be appreciated that other databases may be implemented at the switch, hub office or other sites that can be accessed through the network.

One exemplary database includes a list of sites, their associated STBs 108 and whether the STBs have any input/output devices to allow processing of a conference session. The data for this database can be provided to the filter from each hub office 126. The filter can then amalgamate the data into a larger database. Other mappings of video devices communicating through network 104 can be provided, including a mapping of all STBs 108 or similar devices associated with hub office 126 or mappings of all hub offices 126 associated with a particular STB 108.

Additional "buddy lists", connection or preference lists for contacts can be provided for a particular calling or called party. The lists can include network addresses of each party, IP addresses of any STB associated with any party, telephone numbers of the parties, email addresses of the parties and other information that may be used to identify a calling party or called party. If the filter accessed the database to review the buddy list as a calling party is requesting a conference session, the filter can manage call establishment procedures to the called parties. The filter can also use the database to determine whether a call to a particular party is allowable (by examining the database for the presence or absence of an entry of the particular party associated with the calling party). Such lists may also be maintained by input provided from each party itself through a GUI provided at the STB. Database management techniques and processes known in the art may be used to implement and maintain such lists. The information may be uploaded to the network, switches and appropriate filters and hub offices, as necessary.

Using such exemplary databases, a filter can identify additional information about a call by correlating details about the session provided by the switch (such as the calling and called numbers) against databases accessed by filter 130, 136. Using the results of the database searches, the filter can then identify different associations for the destination party to other elements in the system. Such associations may include identifying a corresponding site and STB associated with the communication terminal at the called (or calling) number. Such associations can then be used to provide additional signals to other elements associated with the call. It will be appreciated that various database mining techniques and systems known to those skilled in the art can be used by filter 130 to identify any such associations.

For example, once one or more associations are identified for a called number, the filter can then initiate a further direct or indirect message ultimately destined to the STB associated with the called number. The STB may be programmed to receive and respond to such message by providing additional call processing features relating to the call through the television associated with it.

In the embodiment, hub office 126 provides a convenient communication point between filter 130, 136 and STBs 108, since the hub office is already in communication with its group of STBs through network 104. Hub office 126 also receives additional information about telephone calls, both calls initiated from various telephony networks (e.g., TDMA, IP and others) and other communication devices and networks (e.g., e-mail, PDAs, etc.).

When the filter finds a record for the destination party in its database identifying a related STB and hub office, the embodiment can then provide additional information about the session to the television associated with the STB. The embodiment accomplishes this by generating and sending a command to provide information about the call to identified STB. The destination party may be identified by its telephone number, IP address associated with its STB, email address or other unique information.

The filter may provide signals to the STB through any appropriate communication channel through network 104. One channel is to have the switch generate and send a message to the STB. Another channel is to send the message through the hub office.

When signals from the filter are processed through the hub office, they are processed in the following manner. First, a signal identifying the STB is generated and sent from the filter to the hub office (as identified in the database). The signal is received at a notification suite 140 in the hub office. The notification suite is responsible for receiving any signals or messages from any filter, extracting the called party data therefrom and generating a command to be sent to the STB associated with the called number. The command may be to generate a specific GUI on the television associated with the call, providing information about the call. The command is provided to middleware module 142. Middleware module receives command signals from various internal and external sources, then packages and addresses them into an appropriate message packet for transmission through network 104 for ultimate delivery to the STB 108 associated with the called number for the receiving communication terminal. Outgoing messages may be provided in various format, including an IP-protocol may be used such as formats and parameters defined by Microsoft's television initiative MSTV (trademark). When such services are provided as web services, any suitable web-based protocol may be used for message handling among elements, including XML and Simple Object Access Protocol (SOAP).

When a particular STB receives the command from a hub office, the STB may then generate specific notifications to the television set. As such, the STB may relay to the user at the site information about the communication terminal call to his television set through a GUI.

For some GUIs, the user is provided with the option of providing a responding command for the call (e.g. answer the call). For such a responding command, when the STB receives the responding command, the STB can then generate a responding message that is sent to the hub office and the middleware module. The middleware module then provides the responding command to the notification module and the notification module can generate and send a signal containing the responding command to the associated filter. Once the filter receives the signal containing responding command, it can then provide the command to the switch, which can then process the command for the call.

Figure 2:
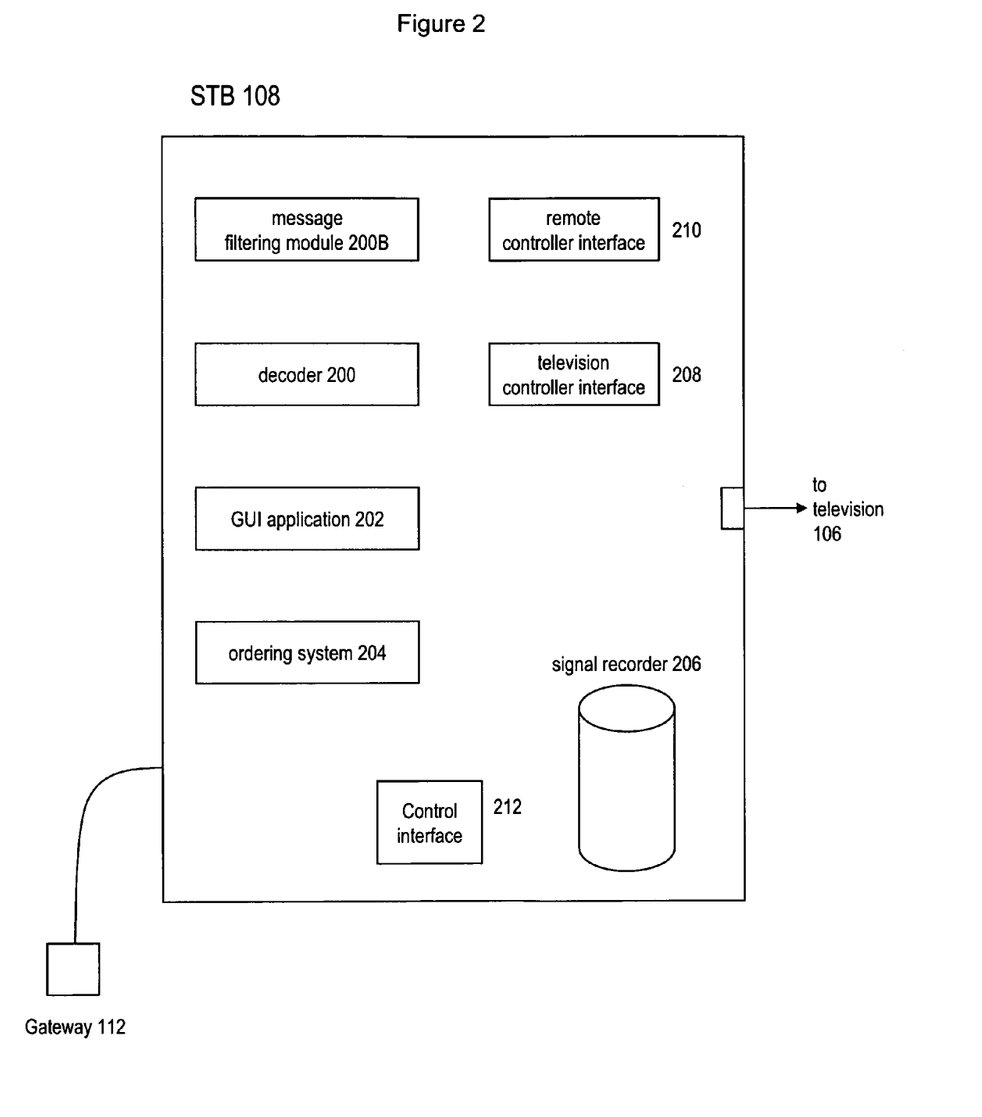
FIG. 2 is a block diagram of the set top box of FIG. 1.

Referring to FIG. 2, elements of STB 108 are provided. As noted earlier, STB 108 comprises signal decoder module 200 (with message filtering module 200B), GUI application generator module 202 and program ordering module 204. Decoder module 200 and filtering module 200B receive and extract any video, audio and control signals received from server 110. They also provide a conduit for generating and transmitting outbound control signals and datastreams from STB 108 to server 110. STB 108 also comprising data storage unit 206 for recording video signals "on the fly"; it may also store local data relating to "buddy lists". Such recordings may be done to a semi-permanent storage device such as RAM or a hard drive. Television control interface 208 provides commands to control the connected television 106 (e.g. volume control). Remote control interface module 210 provides the routines to accept and process commands from the remote control (e.g. volume control, pause video signal etc). Communication terminal control interface module 212 provides a direct connection to communication terminal 116A. It sends and receives video and audio signals and control signals therefrom. Depending on the call message received by STB 108, STB 108 can generate one or more GUIs that will be displayed on the connected television 106. While the GUIs provide only displayed information on television 106, they also present options for controlling either one or both of the associated call (currently presumably ringing on communication terminal 116A) or the video program being channelled through STB 108 from head end 120 or hub office 126 to television 106. Each module may have one or more (software) processes that are executed thereon to provide the functionality for the module.

A description is provided on exemplary sessions that may be processed by an embodiment. With networks 102 and 104, a conference session involving a calling party and one or more called parties may be established through the following sessions:

(1) an IP to IP session;
(2) an IP to POTS session;
(3) a POTS to POTS session; and
(4) a POTS to IP session;

The processing of the session vis-à-vis switch 128, 134 and filter 130, 136 are described in turn.

For an IP to IP session, an IP conference device initiates a session, which is then received by switch 128. The switch obtains the destination data and the IP session filter 130 extracts and processes the source data. If the switch is configured to communicate directly with the related STB regarding the call, the switch sends an initiation message to the STB. If the filter is configured to initiate the communications through the hub office, the filter then extracts the session data information and provides a suitable command to notification suite 138 in the respective hub office 126. Next, notification suite 140 provides a suitable command for middleware 142 that then sends an appropriate command to network 104 for routing to set top box 108. For an IP to TDMA session, the session is processed from IP network 104 through IMS gateway 138 to network 102. Thereafter, TDM switch 134 picks up the session party data and TDM filter 136 extracts the data. Again, a command is ultimately sent to the appropriate STB as noted above. For a POTS to POTS session, a command is ultimately sent to the appropriate STB as noted above. In a POTS to IP session, the session is first routed from network 102 through IMS gateway 138 to IP network 104. Then, IP switch 128 extracts the called party data and provides it to IP filter 130. The called party data is processed in a similar manner as noted above.

Figure 3:
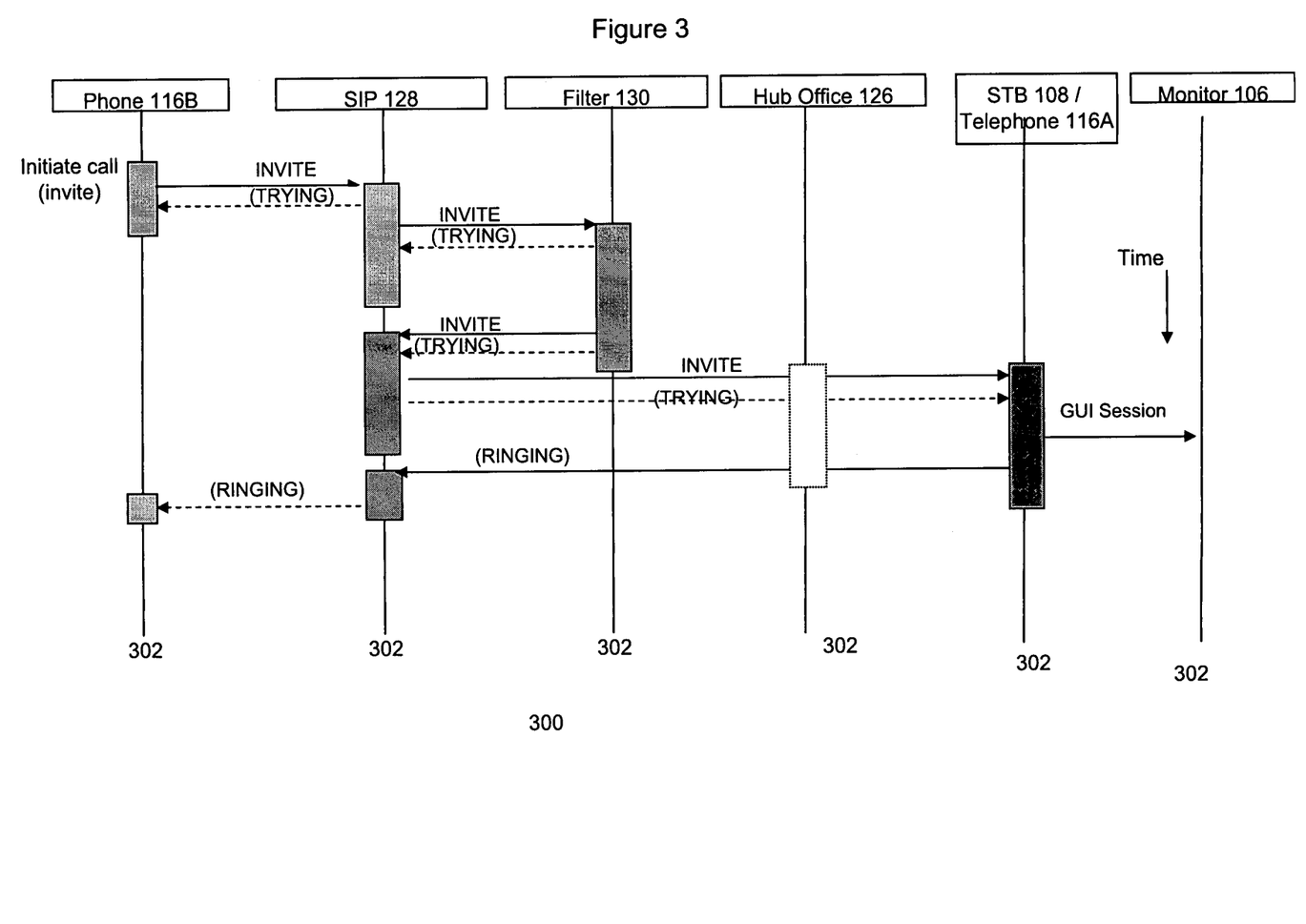
FIG. 3 is a flow chart of a call being established and processed by the network of FIG. 1.

Referring to FIG. 3, chart 300 shows a progression of messages generated and processed in an IP to IP communication terminal call from calling terminal 116B and one called terminal 116A. The messages are processed through switch 128, filter 130, hub office 126 (comprising notification module 150 and middleware module 152), STB 108 and television 106 during initiation of the call by communication terminal 116B and the subsequent answering of the call by communication terminal 116A. Chart 300 shows each element along the top row. Lines 302 emanating downward from each element represent timelines. Boxes along the timelines represent specific processes being executed by the element at that particular time. Horizontal arrows connecting boxes indicate messages that are generated by the process at the base of the arrow and are sent to another process at the tip of the arrow. Additional progressions of messages would be conducted in parallel if the calling terminal is initiating a call to multiple parties.

When a process receives a message, it processes the message and may initiate internal commands and response message(s). Starting from the top left corner of chart 300, communication terminal 116B initiates a call that is destined to communication terminal 116A, as noted per the initiate call block. The initial message that is generated for the call is an "invite" message generated by communication terminal 116B which is sent to SIP switch 128. The "invite" message includes call management data such as the called number of communication terminal 116A. As an initial acknowledgement, SIP switch 128 generates and sends a "trying" message back to communication terminal 116B. Next, a monitoring process between SIP switch 128 and filter 130 causes the initial "invite" message to be detected at SIP switch 128 and forwarded to filter 130 in a subsequent "invite" message. When filter 130 receives the message, it generates and sends a "trying" acknowledgement message back to SIP switch. At this time, filter 130 can, if prompted, extract call management information from the subsequent "invite" message and assess it against data in its database. This completes an upstream portion of the call request, where a connection invitation is sent upstream from the originating communication terminal 116B to SIP switch 128.

The corresponding downstream portion of the call request involves routing the call through network 104 using routing parameters provided by switch 128 and attempting to make a connection to the destination communication terminal 116. For this embodiment, filter 130 sends back to switch 128 an "invite" and a "trying" message to a call connection process in switch 128. The call connection process is responsible for completing the connection request for the originating call. As such, upon receiving the "invite" message, it generates and sends an "invite" and a "trying" message to a call receiving process in STB 108/terminal 116B. This set of messages may or may not be provided through hub office 126 As such, its process is shown in dotted lines. If the hub office process is activated, it generates and sends the message using the notification and messaging modules identified earlier. In either messaging scheme, when communication terminal 116B receives the message, it can initiate an audible "ringing" signal.

When STB 108 receives the "ringing" signal (or any other signal to indicate that an outside terminal is attempting to establish a call with its connected terminal 116A, STB 108 can use that signal to initiate generation of a requested GUI on television 106. STB 108 also generates a responding "ringing" message that is sent to switch 128 (optionally through hub office 126 and filter 130).

When switch 128 receives the "ringing" message, calling communication terminal 116B is notified that the called communication terminal 116A is ringing. As such, switch 128 (or filter 130) generates and sends an acknowledgement "ringing" message to communication terminal 116A. It will be appreciated that other messaging protocols and routines may be implemented to synchronize and notify elements in the call about the status of the other elements.

For other status events for a call (e.g., called communication terminal is busy, called communication terminal has gone off hook to complete the call, called communication terminal has gone back on hook to terminate the call, etc.), other messages may be initiated to be sent by filter 130 (or switch 128) to STB 108. STB 108 can then selectively process the information in the message to update the GUI session. For example, if a subsequent message is that the call has been answered or that the calling party has hung up its communication terminal, then STB 108 may terminate the GUI session.

It will be appreciated that terminal 116B at site 100 may also initiate a call, which would generate or initiate a similar set of call establishment messages to be sent to the called parties (as previously described). A call initiation process may be provided at STB 108 that generates a set of call initiation GUI(s) on television. STB 108 may have local data that provides a "buddy list" for calls that can be initiated from that site. Alternatively, it may have processes that provide remote queries to remote databases (for example, databases maintained by filter 130) to access such lists and provide calling options through GUIs through the STB 108 generated on the connected television 106 to the user. Processes on STB 108 also control the processing of inputs from terminal 116A to encapsulate signals from same into any datastreams transmitted through network 104 destined to the other parties on the call. Similarly, processes on STB 108 are provided to extract intended output signals (e.g. video signals and audio signals) received from the other parties on the call and provide them to the respective output devices and televisions connected to STB 108. When a process in STB 108 is managing a call (either inbound or outbound), it uses a standardized communication messaging protocol with switch 128 and filter 130 so each device has knowledge of what the received/transmitted message means and what activities need to be performed in response to a particular received message.

Figure 4A:
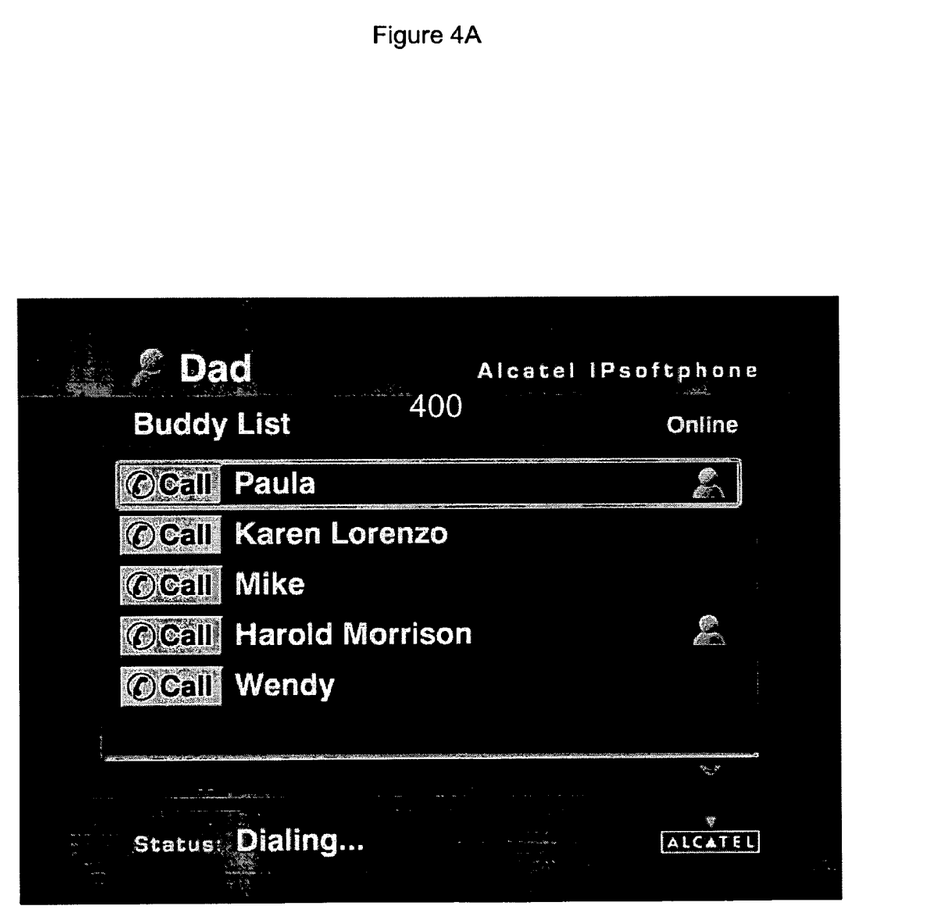
FIG. 4A is an exemplary graphical user interface (GUI) generated by the set top box on the television of FIG. 1 while initiating a video conference session from the set top box.
Figure 4B:
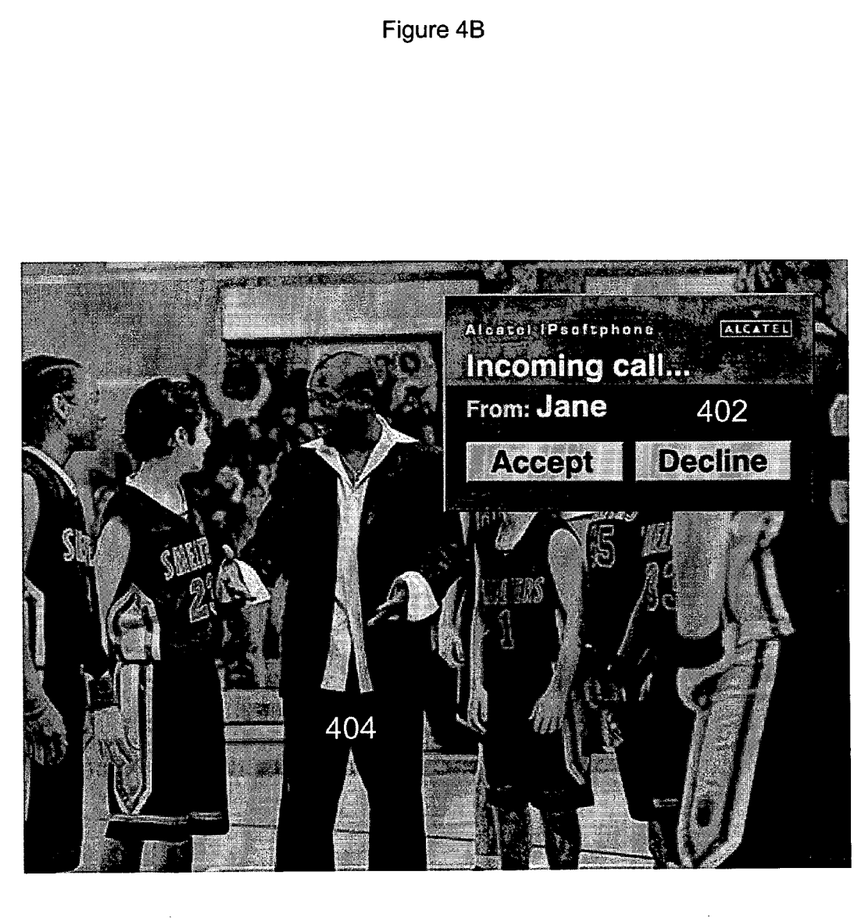
FIG. 4B is another exemplary graphical user interface (GUI) generated by the set top box on the television of FIG. 1 while processing an incoming session request sent to the set top box.
Figure 4C:
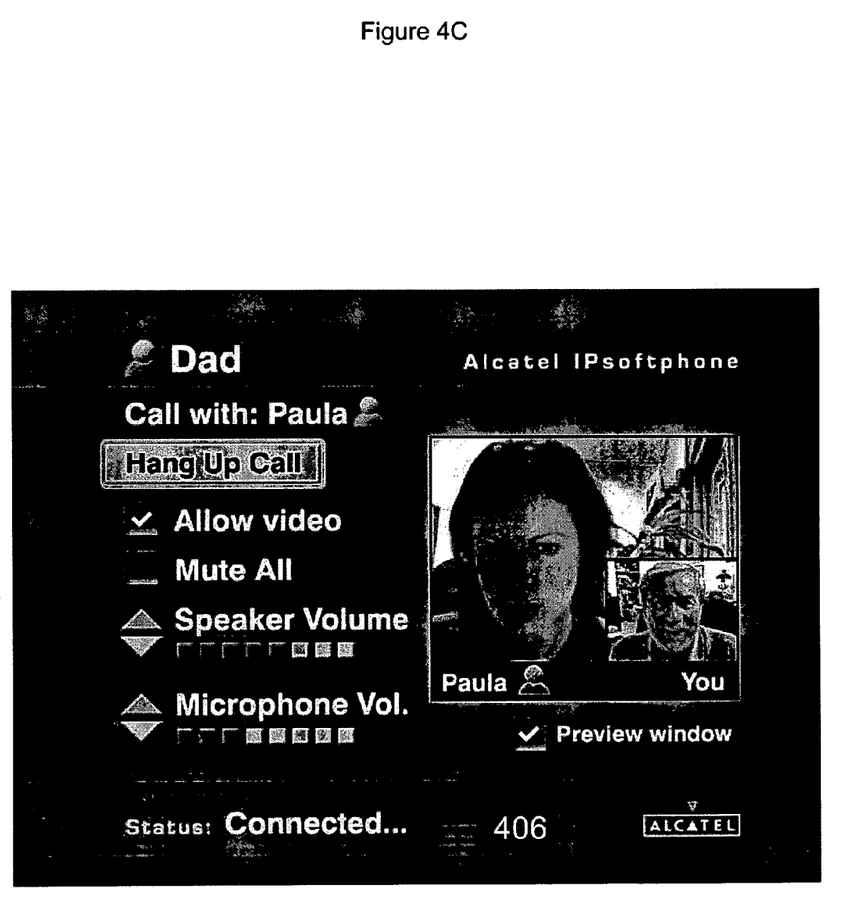
FIG. 4C is yet another exemplary graphical user interface (GUI) generated by the set top box on the television of FIG. 1 during processing of a conference session.

Further detail is provided on processing aspects of a session through GUIs generated on television 106 through STB 108 through exemplary GUIs shown in FIGS. 4A, 4B and 4C during different stages in processing different sessions.

First, referring to FIG. 4A, GUI 400 is generated by STB 108 for display on television 106 and relates to a session being initiated by a user of STB 108. GUI 400 is provided on top of the ongoing video image provided by STB 100 for television 106 to provide the selected video program. GUI 400 may be displayed for a limited time, as to not permanently interfere with the ongoing video transmission of video program. Preferably, GUI 400 provides a window of information that is clearly distinctive from the ongoing program. However, visual enhancements may be provided to the GUI to ensure that the GUI is both prominent, but not too overbearing. For example, GUI 400 may be generated in a large window, but may have a translucent background, allowing the native video image to be produced "behind" GUI 400.

GUI 400 is generated when the user at STB 108 initiates a "call buddy" command, activated through his remote control. When the "call buddy" command is initiated, STB 108 receives the command and generates and sends a command to SIP switch 128 to retrieve contact information associated with STB 108. When switch 128 receives the command, it accesses its database to determine what parties that STB 108 can communicate with and any additional information associated with the parties (e.g. current status in network 104). Then, SIP switch 128 generates and sends a status message to STB 108 through network 104 providing the status information. STB 108 receives the status information then builds a list of contacts with status information (if available) and generates a corresponding GUI 400 for output to television 106. The "online" status reflects whether the party is active on the internet at the present time. Through GUI, the user can navigate through the list of contacts, highlight one or more contacts, then selectively initiate a call to the highlighted contacts by activating a designated key on the remote control. When the designated key is activated, STB 108 determines what contacts have been selected and sends a call activation message to SIP switch 128. When SIP switch 128 receives the message, it then generates appropriate call request signals to each of the contacts and builds a conference linking all positively responding parties to the user at STB 108.

Next, referring to FIG. 4B, GUI 402 is generated by STB 108 on television 106 and relates to a calling party requesting a connection of a session to user of STB 108. Preferably, GUI 402 provides a window of information that is distinctive from the ongoing image 404. GUI 402 is generated when an external calling party is requesting that the user at STB 108 answer a "call". The user can answer the call by activating the appropriate "answer" key on his remote control. When the "answer" command is initiated, STB 108 receives the command and generates and sends a command to SIP switch 128 to establish a communication session between the calling party and STB 108. If there are one or more participants contacts for the session, then the STB is allowed to receive communications from and provide communications to the other participants through SIP switch 128. Then, SIP switch 128 generates and sends a connection message to STB 108 through network 104 providing the connection information for the session. STB 108 receives the connection information and establishes the appropriate audio and or video connections between STB 108 and the other participants in the session through connections managed by SIP switch 128.

Next, referring to FIG. 4C, GUI 406 is generated by STB 108 on television 106 and provides the user with a set of commands to control aspects of an established session. As with other GUIs, GUI 406 preferably provides a window of information that is distinctive from the ongoing image 412. GUI 406 is generated when a session has been established involving STB 108 and one or more other participants and when the user wishes to control an aspect of the session. For example, the user can control the following aspects of the session: whether the video feed is enabled; whether the audio feed is enabled; the volume level of the background video image; the volume of the session; and whether to terminate the session. Subwindows in GUI 406 provide video images of the local party captured through unit 116 and images from one or more of the connected remote parties in the session. Individual commands keys can be programmed on the remote control to represent each function. When a command is initiated relating to network-based data for the session (e.g. "terminate session" or toggling of the "allow video" state), STB 108 receives the command and generates and sends an appropriate command to SIP switch 128. SIP switch 128 receives the command and provides an updated connection command message to STB 108 through network 104. In some embodiments, volume for both the microphone and the speaker for the session is locally controlled via STB 108 for unit 116. However, in other embodiments, control for such aspects may be provided through settings controlled at switch 128.

It will be appreciated that other session commands may be implemented in the GUI.

Figure 5:
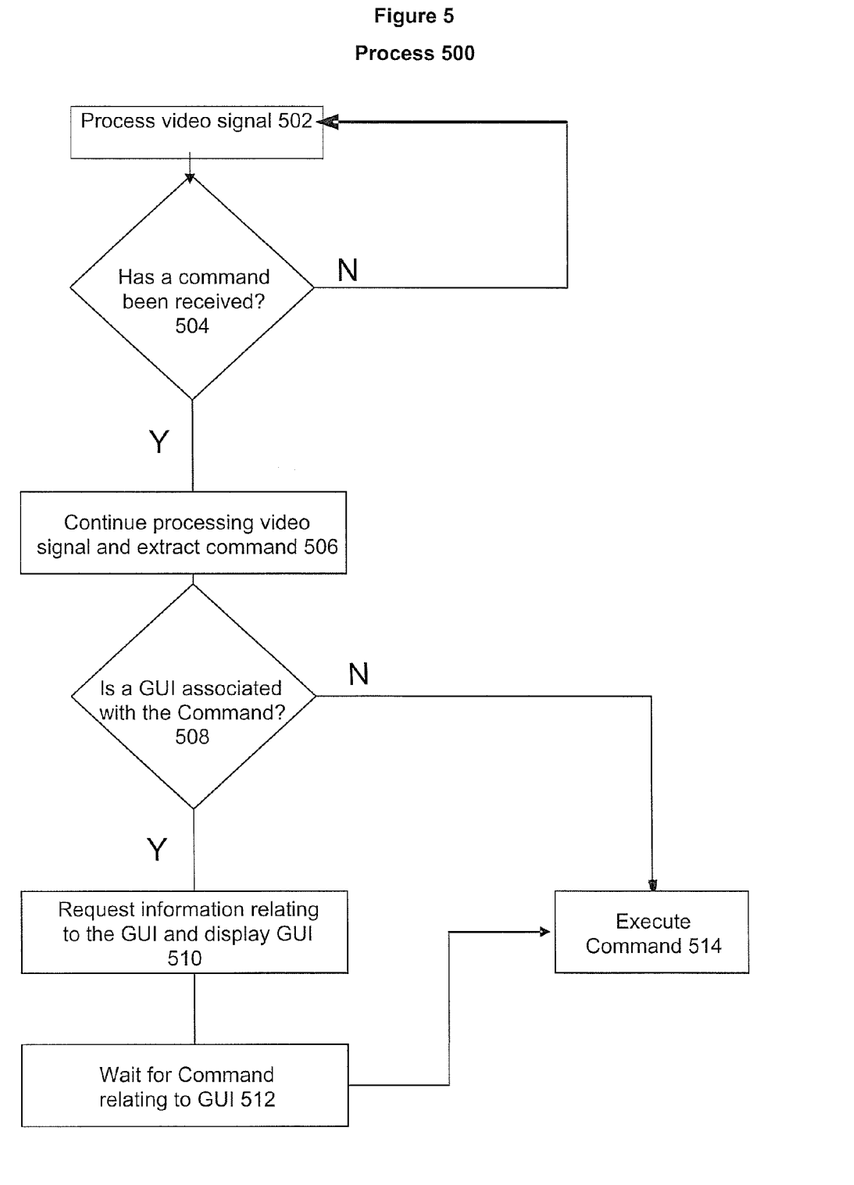
FIG. 5 is a flow chart of processes executed by the set top box on the television of FIG. 1 during processing of a conference session.

Referring to FIG. 5, a basic flow chart 500 of processing of input and output signals is provided for STB 108 when a session message signal has been received. At step 502, a video signal is being process as normal. At step 504, a loop test is initiated where STB 108 waits for session command message. If no message is received, then the STB returns to step 502. If message has been received, then at step 506, STB 108 continues to process the video signal and then extracts the command from the message. Separate processes may monitor for messages received from the remote control and message received from SIP switch 128. As such, when the message is received, its origin may be known. Alternatively, the command can be analyzed and its nature may reveal the origin. STB 108 may have a database of expected commands received from either the remote control or switch 128. In processing the command, STB 108 identifies whether or not it can locally process a command (e.g. change the volume setting) or whether it require additional information from switch 128 for the session (e.g. the command is to establish the session). Next at step 508, STB 108 determines whether the command has an associated GUI with it. If it does, at step 510 STB 108 requests what ever information is required to populate the GUI (either from its database or information provided from external sources, such as server 134) and generates the GUI for the connected television 106. Next at step 512, once the GUI is displayed, it waits for any commands associated with the GUI from the remote. At step 514, if a command is provided, STB 108 processes the command accordingly. From step 508, if the command has no GUI associated with it, then it progress to step 514, to execute the command.

Further, it will be appreciated that while the embodiment is described as controlling aspects of a (voice) telephone session through a separate video STB, it will be appreciated that other embodiments may be provided to control various combinations of video, audio, telephone and other signals through a central system at a destination site.

It will be appreciated that all of the modules, processes, data bases, data processing data transmission, signals, packets, messages and other features and techniques described herein may be implemented in software, firmware and hardware processes and designs using known techniques of those skilled in the art.

Although the invention has been described with reference to certain specific embodiments, various modifications thereof will be apparent to those skilled in the art without department from the scope of the invention.

We claim:

1. An Internet Protocol (IP) multimedia system gateway that enables a call to be transmitted and received across both packetized and switched network architectures between a calling party and a called party, the gateway comprising:
   a filter server that is configured to receive call data from the calling party requesting initiation of a call session with the called party, wherein the call data identifies the calling party and the called party;
   a switch associated with the filter server, wherein the filter server is configured to monitor call management traffic processed by the associated switch, and permit the called party to control the call and a video program related to the call that is displayed on the television, and a Graphic User Interface (GUI) session provides options to control the call and the video program and both online and offline contact information for the calling party and the called party; and
   a database accessible by the filter server, the database containing data relating to telephone numbers, the called party, the calling party, and a subscriber terminal associated with the called party, wherein a communication network server is configured to examine the database for the presence or absence of an entry associated with the calling party and generate the GUI session on a television associated with the called party when the calling party requests that the called party should answer the call and both the call and television signals are provided through a set top box.

2. The gateway of claim 1, wherein a buddy list is maintained on the database, with the filter server, the buddy list accessible by remote queries from either the calling party or the called party.

3. The gateway of claim 1, wherein the GUI session establishes a conference session involving the called party and the calling parties from a group consisting of four options:
   an IP to IP session;
   an IP to POTS session;
   a POTS to POTS session; and
   a POTS to IP session.

4. The gateway of claim 1, wherein the switch is a Session Initiation Protocol (SIP) switch.

5. The gateway of claim 1, wherein the filter server controls volume for a microphone and a speaker associated with the GUI session.

6. The gateway of claim 1, wherein the filter server sends additional information about the GUI session to a television associated with the called party, the additional information extracted from a record found by the filter server in the database, the record being associated with the calling party.

7. A method of enabling a call to be transmitted and received across both packetized and switched network architectures between a calling party and a called party, the method comprising:
   receiving, with a filter server, call data from the calling party requesting initiation of a call session with the called party, wherein the call data identifies the calling party and the called party; monitoring, with the filter server, call management traffic processed by an associated switch; accessing, with the filter server, a database containing data relating to telephone numbers, the called party, the calling party, and a subscriber terminal associated with the called party;

examining, with the filter server, the database for the presence or absence of an entry associated with the calling party;

generating, with the filter server, a Graphical User Interface (GUI) session on a television associated with the called party when the calling party requests that the called party should answer the call; and permitting, with the filter server, the called party to control the call and a video program related to the call that is displayed on the television, wherein the GUI session provides options to control the call and the video program and both online and offline contact information for the calling party and the called party, and both the call and television signals are provided through a set top box.

8. The method of claim 7, further comprising:
maintaining on the database, with the filter server, a buddy list accessible by a remote query from either the calling party or the called party.

9. The method of claim 7, further comprising:
establishes a conference session involving the called party and the calling parties from a group consisting of four options:
an IP to IP session;
an IP to POTS session;
a POTS to POTS session; and
a POTS to IP session.

10. The method of claim 7, wherein the switch is a Session Initiation Protocol (SIP) switch.

11. The method of claim 7, further comprising:
controlling, with the filter server, volume for a microphone and a speaker associated with the GUI session.

12. The method of claim 7, further comprising:
using the filter server to extract additional information from a record found in the database, the record being associated with the calling party; and
sending the additional information to a television associated with the called party for display in the GUI session.

13. A method of using a filter server to send a call from a calling party to a set top box (STB) associated with a called party, the method comprising:
generating a signal that identifies the STB associated with the called party;
sending the generated signal from the filter server to a switch associated with the filter server;
receiving the sent signal in the switch;
extracting called party data associated with a called number from the received signal in the switch;
generating a command in the switch in response to the extracted data;
sending the command from the switch to the STB associated with the called number;
generating, in response to the command, a Graphical User Interface (GUI) session on a television associated with the called party, the GUI session providing information about the call and both online and offline contact information for the calling party and the called party; and
using the switch to permit the called party to control the call and a video program related to the call that is displayed on the television, wherein the GUI session provides options to control the call and the video program, wherein both the call and television signals are provided through the STB.

14. The method of claim 13, further comprising:
maintaining on the database, with the filter server, a buddy list accessible by a remote query from either the calling party or the called party.

15. The method of claim 13, further comprising:
establishing a conference session involving the called party and the calling parties from a group consisting of four options:
an IP to IP session;
an IP to POTS session;
a POTS to POTS session; and
a POTS to IP session.

16. The method of claim 13, wherein the switch is a Session Initiation Protocol (SIP) switch.

17. The method of claim 13, further comprising:
controlling, with the filter server, volume for a microphone and a speaker associated with the GUI session.

18. The method of claim 13, further comprising:
using the filter server to extract additional information from a record found in the database, the record being associated with the calling party; and
sending the additional information to a television associated with the called party for display in the GUI session.

\* \* \* \* \*